United States Patent [19]

Gill

[11] 4,044,706

[45] Aug. 30, 1977

[54] TRAILER DIRECTION INDICATOR

[76] Inventor: Chester C. Gill, 950 Colorado Ave., A-27, Stuart, Fla. 33494

[21] Appl. No.: 734,722

[22] Filed: Oct. 22, 1976

[51] Int. Cl.$^2$ .............................................. B60Q 1/42
[52] U.S. Cl. ................................... 116/31; 116/28 R; 180/1 AP
[58] Field of Search ................... 116/31, 56, 28 R, 51, 116/36; 280/292; 180/82 R, 1 AP; 33/264

[56] References Cited

U.S. PATENT DOCUMENTS

| 2,681,633 | 6/1954 | Basso | 116/28 R X |
|---|---|---|---|
| 2,736,885 | 2/1956 | Thompson | 116/28 R |

FOREIGN PATENT DOCUMENTS

| 532,997 | 11/1954 | Belgium | 116/31 |
|---|---|---|---|
| 534,908 | 2/1955 | Belgium | 116/31 |

Primary Examiner—Daniel M. Yasich

Attorney, Agent, or Firm—Duckworth, Hobby, Orman, Allen & Pettis

[57] ABSTRACT

This invention relates to a trailer guide for visually assisting the driver in manually operating the steering mechanism of a vehicle-trailer combination during travel in the reverse direction. The indicator comprises a frame for being coupled to the steering mechanism of the car and two spaced pivots coupled to the frame. A first longitudinal indicator is pivotally coupled to the first pivot and a second longitudinal indicator is pivotally coupled to the second pivot. One end of the first longitudinal indicator is movably coupled to an adjacent end of the second longitudinal indicator such that the combination of the first and second longitudinal indicators will predict the movement of the motorized vehicle and the trailer coupled thereto when the combination is moving in a reverse direction and the steering mechanism is operated.

7 Claims, 6 Drawing Figures

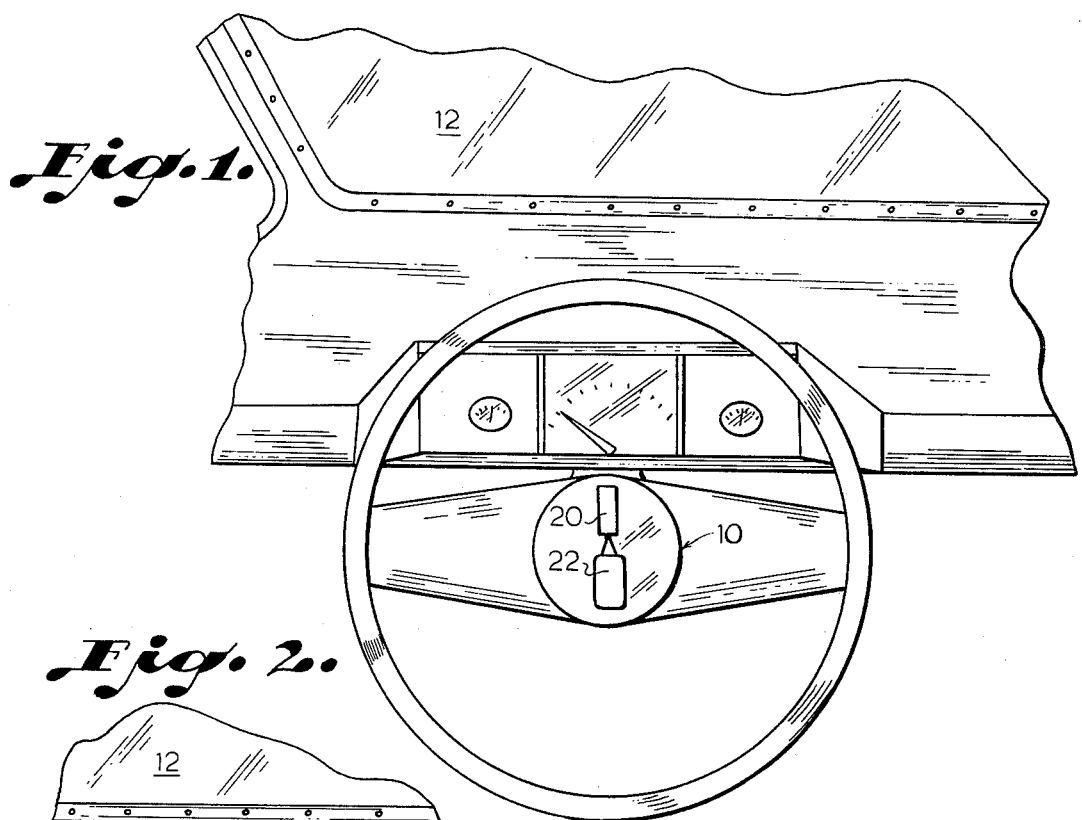
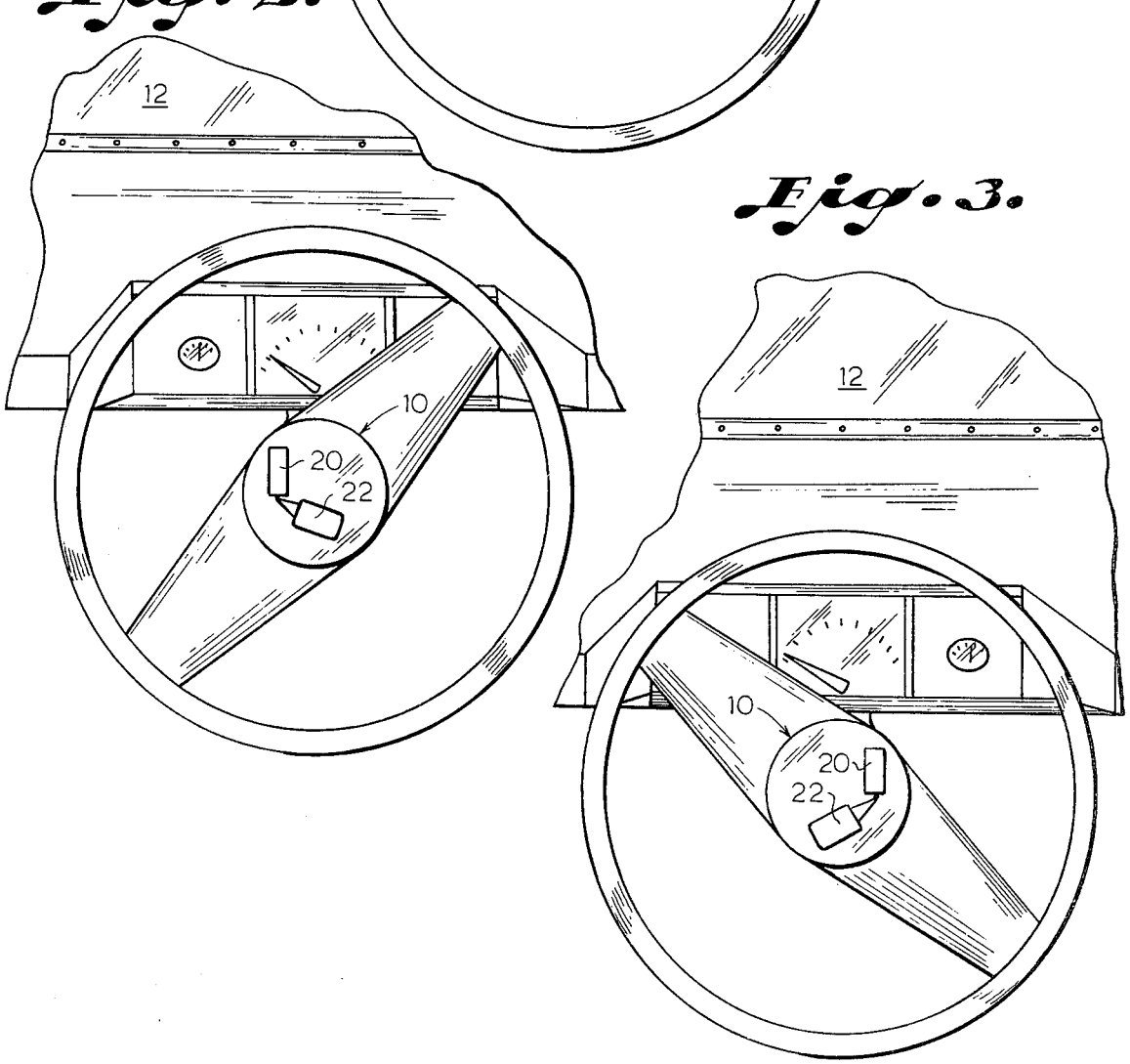

TRAILER DIRECTION INDICATOR

BACKGROUND OF THE INVENTION

I. Field of the Invention

The present invention relates generally to automotive accessories and more particularly to a visual indicator for coupling to the steering wheel of the motor vehicle for indicating the expected movement of a trailer being drawn by a vehicle as the vehicle moves in the reverse direction.

II. Description of the Prior Art

The increased use of recreational trailer units, and rental trailers that are drawn by automotive type vehicles has led to the introduction and development of various trailer hitch guiding devices which are attached to or detachably mounted on external parts of the trailer hitch, the drawing vehicle, the trailer or towed vehicle, the rear window, mirrors, etc. While each of these various types of guiding devices is satisfactory for the intended purpose, which is allowing the driver to quickly couple the vehicle to the trailer, the disadvantage of these guiding devices is that they do not provide the driver of the drawing vehicle the means of knowing exactly which way to turn the steering wheel to cause the trailer to travel in the desired direction during all phases of operation, including forward, reverse and standstill speeds. Also, these devices do not provide the driver the added safety of knowing at all times the relative position of the trailer and the drawn vehicle and they do not have the advantage of being universally adaptable to the various kinds of trailing vehicles presently in use.

The difficulty in backing a trailer into a preselected location, especially in tighter congested quarters, is so great that even experienced drivers require constant practice and are at times required to stop and think which way the steering wheel should be turned. The use of a second person is often required to assist and direct the driver during the backing up operation. In the case of a novice driver, backing a trailer is often virtually impossible, always confusing and frustrating. In most cases a novice backing a trailer is at best unsafe, even to the extent the damage to the trailer and surrounding property is a common result.

The use of a second person does not totally alleviate the problems of knowing which way to turn the steering wheel. For example, the guiding individual may direct the driver to turn the trailer to the right and yet if the driver does not know that he must turn the steering wheel to the left, he is further frustrated and confused in attempting to follow these directions, especially when the trailer may tend to move in the opposite direction.

The prior art is not helpful in discovering a solution for this problem. Basso in U.S. Pat. No. 2,681,633 discloses an elongated pointer attached to a base which is affixed to the shelf area above the dash of the motor vehicle for indicating to the driver the proper time for turning the steering wheel during the parallel parking process. Various prior art patents have been issued to cover devices and methods for allowing the driver of the drawing vehicle to quickly move the vehicle in a reverse direction for coupling to a trailer to be pulled. Inventions of this type are disclosed by White in U.S. Pat. No. 3,889,384, Alexander in U.S. Pat. No. 3,866,328, Lowell in U.S. Pat. No. 3,858,966, Voelkerding in U.S. Pat. No. 3,765,703, Salmi in U.S. Pat. No. 3,734,539, and Leber in U.S. Pat. No. 3,670,423.

However, none of these devices are suitable for solving the problem at hand, that is for illustrating the selection of the proper direction a driver must turn the steering wheel of the drawing vehicle prior to and during the backing operation so as to cause the trailing vehicle to travel in a desired direction. In contrast with the prior art devices this apparatus provides the driver with a visual indication of the correctness of incorrectness of the direction he has turned the steering wheel prior to and during the actual backing operation. In as much as the direction in which the steering wheel is turned while backing a trailer is directly opposite that normally expected in the forward direction, the driver of the drawing vehicle must rely on his memory, a second person, or the trail and error technique to determine the correctness or incorrectness of his actions during the backing operation.

SUMMARY OF THE INVENTION

This invention relates to a trailer guide for visually assisting the driver in manually operating the steering mechanism of a vehicle-trailer combination during travel in either the forward or reverse direction as well as during periods of no motion. The trailer guide comprises frame means for being coupled to the steering mechanism of the car and having a first pivot thereon for being laterally displaced responsive to the movement of the steering mechanism. The frame means further includes a second pivot thereon spaced from the first pivot. A first longitudinal indicator is rotatably coupled about the first pivot. A second longitudinal indicator is coupled along the longitudinal axis thereof to the second pivot for rotating there around. A first end of the second longitudinal indicator is movably coupled to an adjacent end of the first longitudinal indicator, whereby a movement of the steering mechanism causes a rotational displacement of the first and second longitudinal indicators about said first and second pivots for indicating to the vehicle operator the expected direction of travel of the trailer in response to the steering commands.

BRIEF DESCRIPTION OF THE DRAWINGS

Other objects, features and advantages of the present invention will be apparent from a study of the written description and the drawings in which:

FIG. 1 illustrates a first preferred embodiment of the present invention as attached to the steering wheel of the drawing vehicle showing the indicators in the straight forward position.

FIG. 2 illustrates the position of the first and second indicators as the steering wheel is turned to the left.

FIG. 3 illustrates the position of the first and second indicators with the steering wheel turned to the right.

DETAILED DESCRIPTION OF THE PREFERRED EMBODIMENT

Figure 4:
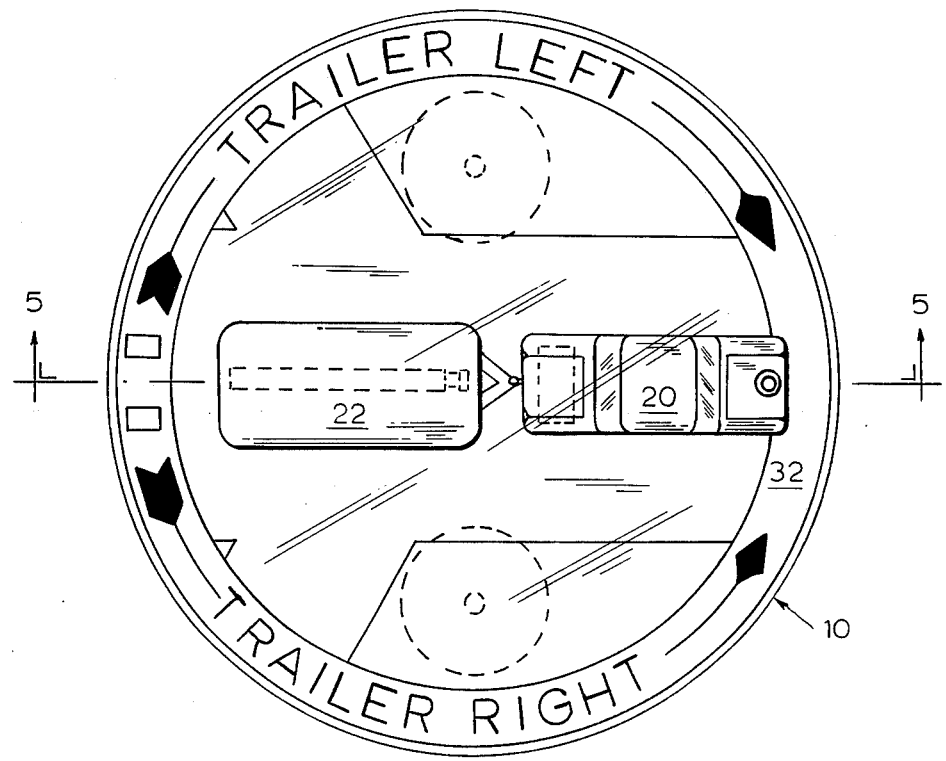
FIG. 4 is a top planar view of the first preferred embodiment in accordance with the present invention.

A first preferred embodiment of the trailer direction indicator is shown generally as 10 in FIGS. 1-5. With specific reference to FIGS. 4 and 5, the trailer direction finder 10 includes a frame means comprising a base plate 24 having a generally circular shape and perpendicularly upstanding sides depending circumferentially therefrom for coupling with a generally circular transparent cover 34. The transparent cover 34 protects the internal elements of the trailer direction indicator 10 from external damage as well as preventing the loss of these elements. Threaded bores are provided in the base plate 34 for receiving therein a threaded shaft 46 which in turn is coupled to a suction cup 16. Two of the suction cups 16 are provided for detachably coupling the trailer direction indicator 10 to the central section of the steering wheel as illustrated generally in FIGS. 1-3.

Figure 5:
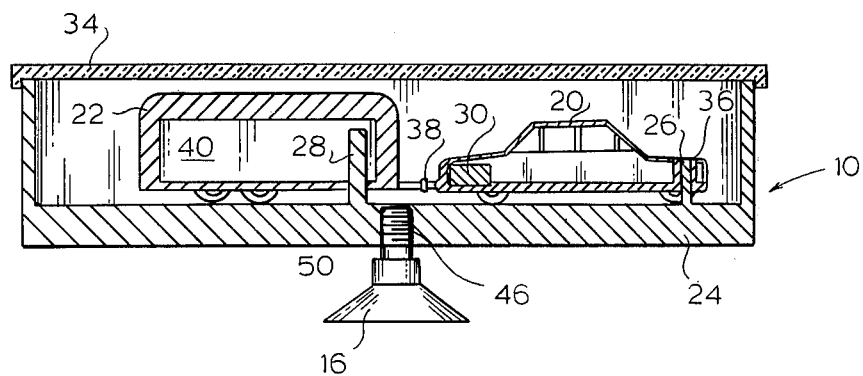
FIG. 5 is a cross-section side elevation view taken along sections lines 2—2 shown in FIG. 4.
Figure 6:
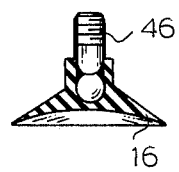
FIG. 6 is a cross-section elevation of the suction cup as illustrated in FIG. 4.

With continuing reference to FIGS. 4 and 5, the first pivot or support pin 26 is perpendicularly coupled to the base plate 24 in a position spaced from a reference point 50 located generally at the center of the base plate 24. The support pin 26 movably communicates within a generally cylindrical bore 36 within a first end of the first elongated or longitudinal indicator 20. The first indicator 20 has the form of an automobile with the support pin 26 located beneath the hood section thereof. The miniature automobile 20 includes a weight 30 formed as an integral part thereof adjacent the second or rear end of the indicator 20.

A guide pin or second pivot 28 is coupled perpendicularly to the base plate 24 at a position spaced from the support pin 26 along a diameter of the base plate 24 on the opposite side of the reference point 50. A second longitudinal or elongated indicator 22 having the form of a trailer or drawn vehicle is coupled at a first or forward end thereof to a second or rear end of the first indicator 20 at a movable or pivoting connector 38. The second indicator 22 includes an elongated longitudinal slot 40 centered along the longitudinal axis thereof for receiving therein the second pivot or guide pin 28. The length of the longitudinal slot 40 is sufficient to allow the second indicator 22 to both rotate about and move longitudinally along the guide pin or second pivot 28 responsive to the movement of a first indicator 20. The base plate 24 is formed from a surface of low sliding friction and both the first indicator 20 and the second indicator 22 include replicas of miniature tires on the bottom surfaces thereof for slidably moving over the upper surface of the base plate 24. While the first preferred embodiment of the present invention illustrates a passenger automobile as the first indicator 20 and a housing trailer as the second indicator 22, it will be obvious that various motor vehicles may be substituted for the first indicator 20 and various forms of trailers may be substituted for the second indicator 22. For example, the first indicator may have the form of a pickup truck and the second indicator 22 may have the form of a boat vehicle. The shapes and sizes of each of these indicators is determined to correspond generally to the types of vehicles used in each instance and may easily be customized to provide an ornamental and functional indicator for coupling to the automobile.

As illustrated in FIG. 4, a printed indicia or decal 32 illustrates and directs the driver as to the proper direction in which the steering wheel 14 of the automobile or drawing vehicle 12 must be turned in order to cause the trailer or towed unit to turn to the right, left or travel straight when moving in the reverse direction. It should be noted at this time that the first indicator 20 and the second indicator 22 will indicate the direction at which the trailer will follow the automobile in either a forward, reverse or stationary speed. However, the trailer direction indicator 10 is most useful when the trailer is being backed up or moved in the reverse direction, since the steering wheel must be turned in the direction opposite the direction of travel of the trailer under these conditions.

The operation of the trailer direction indicator 10 will now be described with reference to FIGS. 1-5. The trailer direction indicator 10 is first secured by the two suction cups 16 to the center portion of the steering wheel 14 of the drawing automobile 12 such that the reference point 50 lies generally along the axis of rotation of the steering wheel 14. Furthermore, the first pivot 26 is positioned generally above or forward of the reference point 50 as illustrated in FIG. 1 representing the pulling vehicle and the trailer, namely the first indicator 20 and the second indicator 22 as traveling in a straight line direction, either forward or reverse. Thus, as the steering wheel 14 is turned about its rotational axis, the first indicator or automobile 20 rotates about the support pin 26 due to the effect of gravity on the weight 30 in the second end thereof. Thus, the first indicator 20 acts as a pendulum being pulled to either one side or the other by the action of gravity upon the weight 30. As the rear or second end of the first indicator 20 moves laterally to one side or the other, the movable coupling 38 will pull the first end of the second indicator 22 therewith. This will cause the longitudinal slot 40 of the second indicator 22 to rotate about and move along the guide pin or second pivot 28. As the center of the rotation changes, the trailer 22 swivels about the movable coupling or trailer hitch 38 as a representation of the movement expected between the towing vehicle and the trailer. It should be recognized at this point that the indication will be obtained prior to any actual movement in the towing or trailer vehicle since the steering wheel 14 may be rotated prior to the movement of either the towing or trailer vehicle in order to indicate the expected direction of travel of each of the vehicles. Thus, when the driver of the towing vehicle 12 wishes to travel in the reverse direction and turn the trailer 22 either to the right or left he merely turns the steering wheel 14 either to the right or to the left and visually interprets the movements of the first indicator 20 and the second indicator 22 responsive to the rotation of the steering wheel 14.

As illustrated in FIG. 1, the trailer or second indicator 22 will remain directly behind the drawing vehicle or first indicator 20 when the steering wheel 14 is turned to the left as illustrated in FIG. 2, the first indicator 20 and the second indicator 22 will move to indicate that the trailer will turn to the right if the vehicle is driven in the reverse direction. In a similar manner if the steering wheel 14 is turned to the right, the first indicator 20 and the second indicator 22 will illustrate that the trailer will turn to the left if the vehicles are moved in the reverse direction.

Of course, the trailer direction finder 10 may be recessed within a visible central section of the steering wheel or it may be secured to the steering wheel by adhesive or fastener means rather than the suction cup 16 as illustrated in FIG. 5. Also, the trailer direction finder may be coupled to another moving element of the steering mechanism, or in the alternative it may be movably attached to a fixed portion of the vehicle and movably coupled by linkage means to the steering system for receiving the rotational movement therefrom.

Thus, a first preferred embodiment of a trailer direction indicator has been illustrated as an example of the invention as claimed. However, the present invention should not be limited in its application to the details illustrated in the accompanying drawings of the specification, since this invention may be practiced and constructed in a variety of different embodiments. Also, it must be understood that the terminology and descriptions employed herein are used solely for the purpose of describing the general operation of the preferred embodiment and therefore should not be construed as limitations on the operability of the invention.

I claim:

1. A trailer guide for visually assisting the driver in manually operating the steering mechanism of a vehicle-trailer combination during travel in the reverse direction, said guide comprising in combination:
   frame means for being coupled to the steering mechanism of the vehicle, said frame means having a first pivot thereon for being laterally displaced responsive to the movement of the steering mechanism, with said frame means having further a second pivot thereon spaced from and relatively below said first pivot;
   a first elongated indicator rotatably coupled adjacent a first end thereof about said first pivot; and
   a second elongated indicator movably coupled along the longitudinal axis thereof to said second pivot for rotating therearound, with a first end of said second elongated indicator being movably coupled to a second end of said first elongated indicator, whereby a movement of the steering mechanism causes a gravitationally induced rotational displacement of said first and second longitudinal indicators about said first and second pivots for indicating to the vehicle operator the expected direction of travel of the trailer to the steering commands.

2. The trailer guide as described in claim 1 wherein said second elongated indicator includes therein an elongated longitudinal slot for receiving therein said second pivot, whereby said second pivot acts as a pivot point around which said second elongated indicator may rotate and longitudinally move responsive to the movements of the steering mechanism.

3. The trailer guide as described in claim 2 wherein said first elongated indicator includes adjacent said second end thereof a weight for rotating said first elongated indicator about said first pivot responsive to the movement of said steering mechanism.

4. The trailer guide as described in claim 3 wherein said first elongated indicator has the form of a miniature motorized vehicle and said second elongated indicator has the form of a miniature trailer vehicle, whereby the movement in the steering mechanism will cause the displacement of said miniature motorized vehicle and said miniature trailer vehicle in the expected direction of travel of the vehicle-trailer combination responsive to the manual operation of the steering mechanism.

5. The trailer guide as described in claim 3 wherein said frame means comprises in combination:
   a base having a reference point thereon, with said first pivot coupled to said base along a diameter at a point spaced from said reference point; and
   means for coupling said base to a center section of the steering wheel of the vehicle, with said reference point being generally along the rotational axis of the steering wheel and said first pivot spaced generally above said rotational axis of the steering wheel for being displaced laterally as the steering wheel is rotated.

6. The trailer guide as described in claim 5 wherein said base comprises:
   a plate having said first and second pivots coupled perpendicularly thereto along and on opposite sides of a forward facing diameter including said reference point; and
   the transparent cover circumferentially coupled to said plate and extending upward over said first and second pivots and said first and second elongated indicators coupled thereto.

7. The trailer guide as described in claim 6 wherein said base coupling means comprises suction cups.

* * * * *